(12) United States Patent
Maier

(10) Patent No.: US 7,241,524 B2
(45) Date of Patent: Jul. 10, 2007

(54) SYSTEM ARCHITECTURE FOR MANAGING HYDROGEN LEAKS INTO FLUID CIRCUITS OF FUEL CELL SYSTEMS

(75) Inventor: Oliver Maier, Worms (DE)

(73) Assignee: General Motors Corporation, Detroit, MI (US)

( * ) Notice: Subject to any disclaimer, the term of this patent is extended or adjusted under 35 U.S.C. 154(b) by 394 days.

(21) Appl. No.: 10/828,757

(22) Filed: Apr. 21, 2004

(65) Prior Publication Data

US 2005/0238931 A1 Oct. 27, 2005

(51) Int. Cl.
*H01M 8/04* (2006.01)
(52) U.S. Cl. .......................... 429/25; 429/26
(58) Field of Classification Search ............. 429/25
See application file for complete search history.

(56) References Cited

U.S. PATENT DOCUMENTS 6,391,485 B1* 5/2002 Perry ........................ 429/13

2002/0061426 A1* 5/2002 Imaseki et al. ............ 429/26
2003/0022045 A1* 1/2003 Wells et al. ............... 429/26
2003/0192315 A1* 10/2003 Corcoran .................. 60/645

\* cited by examiner

*Primary Examiner*—Susy Tsang-Foster
*Assistant Examiner*—Tony Chuo
(74) *Attorney, Agent, or Firm*—Harness, Dickey & Pierce, P.L.C.

(57) ABSTRACT

A pressure management system that balances pressure between first and second fluid circuits of a fuel cell system includes a first fluid reservoir associated with the first fluid circuit and a second fluid reservoir associated with the second fluid circuit. The second fluid reservoir is in fluid communication with the first fluid reservoir. A fluid is transferred from the first fluid reservoir to the second fluid reservoir during an over-pressure condition within the first fluid circuit.

18 Claims, 3 Drawing Sheets

SYSTEM ARCHITECTURE FOR MANAGING HYDROGEN LEAKS INTO FLUID CIRCUITS OF FUEL CELL SYSTEMS

FIELD OF THE INVENTION

The present invention relates to fuel cell systems, and more particularly to managing hydrogen leaks into fluid circuits of fuel cell systems.

BACKGROUND OF THE INVENTION

Fuel cell systems include a fuel cell stack that produces electrical energy based on a reaction between a hydrogen-based feed gas (e.g., pure hydrogen or a hydrogen reformate) and an oxidant feed gas (e.g., pure oxygen or oxygen-containing air). The hydrogen-based feed gas and oxidant feed gas are supplied to the fuel cell stack at appropriate operating conditions (i.e., temperature and pressure) for reacting therein. The proper conditioning of the feed gases is achieved by other components of the fuel cell stack to provide the proper operating conditions.

The fuel cell system includes multiple cooling circuits for cooling various components. At least one cooling circuit is in fluid communication with the fuel cell stack to regulate the temperature of the fuel cell stack at a desired operating temperature. Gaskets within the fuel cell stack seal the cooling circuits from the feed gases flowing through the fuel cell stack. It is conceivable that the hydrogen-based feed gas could leak into one of the cooling circuits.

SUMMARY OF THE INVENTION

Accordingly, the present invention provides a pressure management system that balances pressure between first and second fluid circuits of a fuel cell system. The pressure management system includes a first fluid reservoir associated with the first fluid circuit and a second fluid reservoir associated with the second fluid circuit. The second fluid reservoir is in fluid communication with the first fluid reservoir. A fluid is transferred from the first fluid reservoir to the second fluid reservoir during an over-pressure condition within the first fluid circuit.

In other features, a fluid passage enables the fluid communication between the first and second fluid reservoirs. A first fluid retained within the first fluid reservoir flows into the second fluid reservoir during the over-pressure condition.

In still other features, a first relief mechanism is disposed between the first and second fluid reservoirs and selectively enables fluid communication between the first and second fluid reservoirs. When a first pressure is achieved within the first fluid reservoir, the fluid flows through the first relief mechanism to the second fluid reservoir to relieve the first pressure.

In yet other features, a second relief mechanism is disposed between the first and second fluid reservoirs and selectively enables fluid communication between the first and second fluid reservoirs. When a second pressure is achieved within the second fluid reservoir, the fluid flows through the second relief mechanism to the first fluid reservoir to relieve the second pressure.

In yet other features, a relief mechanism is in fluid communication with the first fluid reservoir. The relief mechanism exhausts the fluid to atmosphere during a critical pressure condition.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
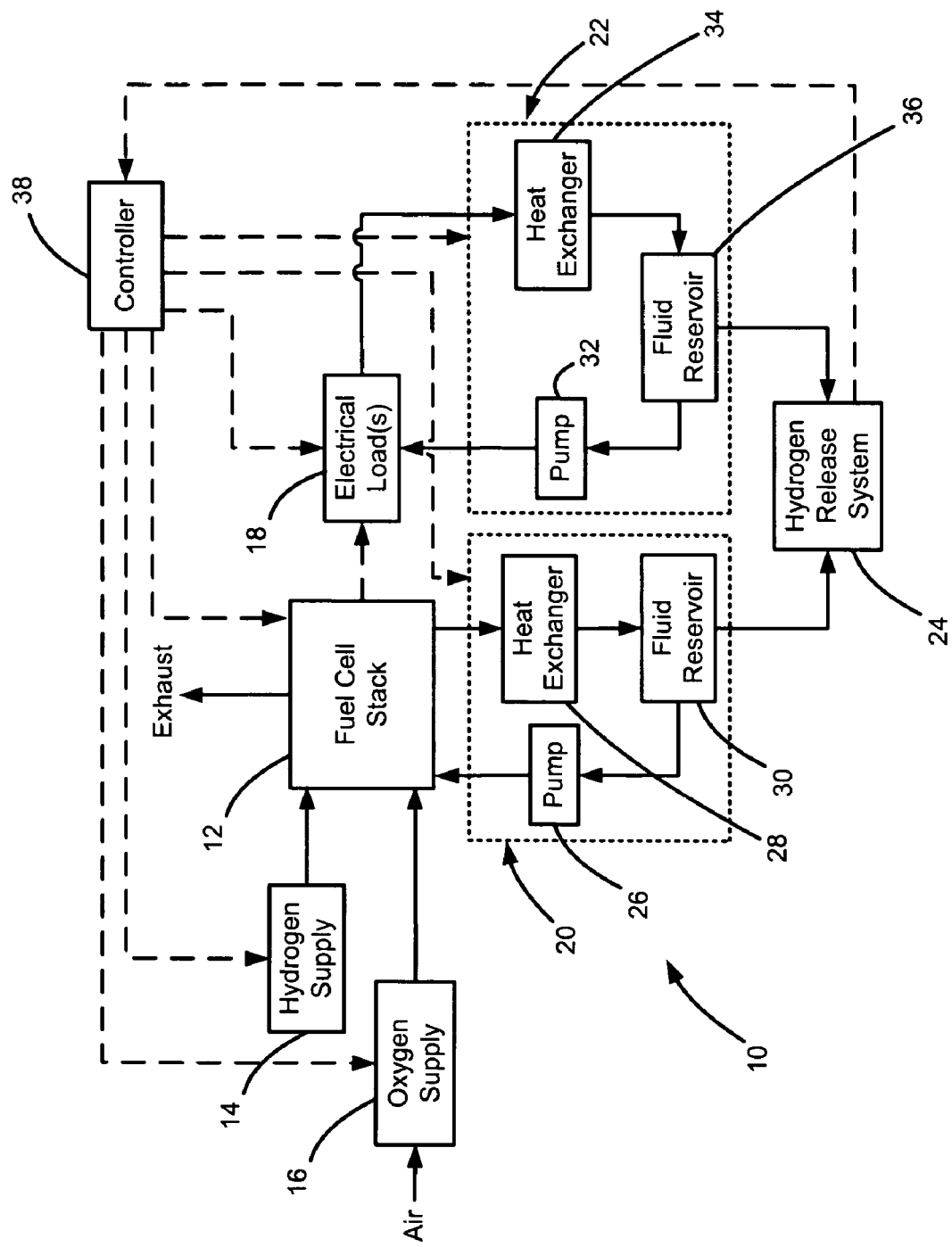
FIG. 1 is a schematic illustration of a fuel cell system including multiple fluid circuits according to the present invention.

Referring now to FIG. 1, a fuel cell system 10 is shown. The fuel cell system 10 includes a fuel cell stack 12, a hydrogen supply unit 14 and an oxygen supply unit 16. The hydrogen supply unit 14 supplies a hydrogen feed gas to the fuel cell stack 12. When the hydrogen feed gas is hydrogen, the hydrogen supply unit 14 includes a storage vessel and the associated plumbing and controls (not shown) to supply the hydrogen to the fuel cell stack 12. When the hydrogen feed gas is a hydrogen reformate, the hydrogen supply unit 14 includes a storage vessel for storing a base fuel and the components, plumbing and controls (not shown) required to dissociate the base fuel into the hydrogen containing feed gas and to supply the hydrogen feed gas to the fuel cell stack 12. The oxidant feed gas is generally provided as oxygen-rich air. Thus, the oxygen supply unit 16 generally includes a compressor, plumbing and controls (not shown) required to supply the oxidant feed gas to the fuel cell stack 12. The fuel cell stack 12 generates electrical energy used to power an electrical load or loads 18. The electrical load(s) 18 can include an electric motor, lights, heaters or any other type of electrically powered components.

The fuel cell system 10 further includes first and second fluid circuits 20,22, respectively, interconnected by a leak management system 24. The first fluid circuit 20 is in fluid communication with the fuel cell stack 12 to regulate a temperature of the fuel cell stack 12. The first fluid circuit 20 includes a pump 26, a heat exchanger 28 and a fluid reservoir 30. Fluid is pumped through the fuel cell stack 12 where it is in heat exchange communication with components of the fuel cell stack 12.

The fluid flowing through the fuel cell stack 12 regulates the temperature of the components of the fuel cell stack 12. In a cooling mode, the fluid draws heat from the components to cool the fuel cell stack 12. In a heating mode, the components draw heat from the fluid to heat the fuel cell stack 12. The fluid exits the fuel cell stack 12 and flows through the heat exchanger 28 where it is in heat exchange relationship with ambient air. In the cooling mode, heat from the fluid is dissipated to the ambient air and in the heating mode, the fluid draws heat from the ambient air. The fluid flows to the fluid reservoir 30 from which, it is again pumped through the first fluid circuit 20 by the pump 26.

The second fluid circuit 22 is in fluid communication with the at least one or more of the electrical loads 18 to regulate a temperature thereof. The second fluid circuit 22 includes a pump 32, a heat exchanger 34 and a fluid reservoir 36. Fluid is pumped through the electrical load(s) 18 where it is in heat exchange communication with the electrical load(s) 18. In a cooling mode, the fluid draws heat from the electrical load(s) 18 to cool the electrical load(s) 18. In a heating mode, the electrical load(s) 18 draw heat from the fluid to heat the electrical load(s) 18. The fluid exits the electrical load(s) 18 and flows through the heat exchanger 34 where it is in heat exchange relationship with ambient air. In the cooling mode, heat from the fluid is dissipated to the ambient air and in the heating mode, the fluid draws heat from the ambient air. The fluid flows to the fluid reservoir 36 from which, it is again pumped through the second fluid circuit 22 by the pump 32.

A controller 38 is in communication with the various components of the fuel cell system 10 to monitor and regulate operation of the fuel cell system 10. More particularly, the controller 38 communicates with the hydrogen supply unit 14 and the oxygen supply unit 16 to control the supply of hydrogen and oxygen to the fuel cell stack 12. The controller 38 is also in communication with the fuel cell stack 12 to monitor operating characteristics such as, but not limited to, temperature and pressure within the fuel cell stack 12. The controller 38 communicates with the electrical load(s) 18 to control operation thereof. The controller 38 further communicates with the first and second fluid circuits 20,22 to regulate temperatures of the fuel cell stack 12 and electrical load(s) 18, respectively.

As the fluid flowing through the first fluid circuit 20 flows through the fuel cell stack 12, it is often separated from the hydrogen feed gas by sealing gaskets (not shown). Because the sealing gaskets do not always provide a perfect seal, high pressure hydrogen feed gas can leak into the fluid flowing through the first fluid circuit 20. Similarly, the fluid flowing through the second fluid circuit 22 can flow through other components and/or electrical load(s) 18 that also have the hydrogen feed gas flowing therethrough. Therefore, it is possible that the hydrogen feed gas can leak into the fluid flowing through the second fluid circuit 22.

Figure 3:
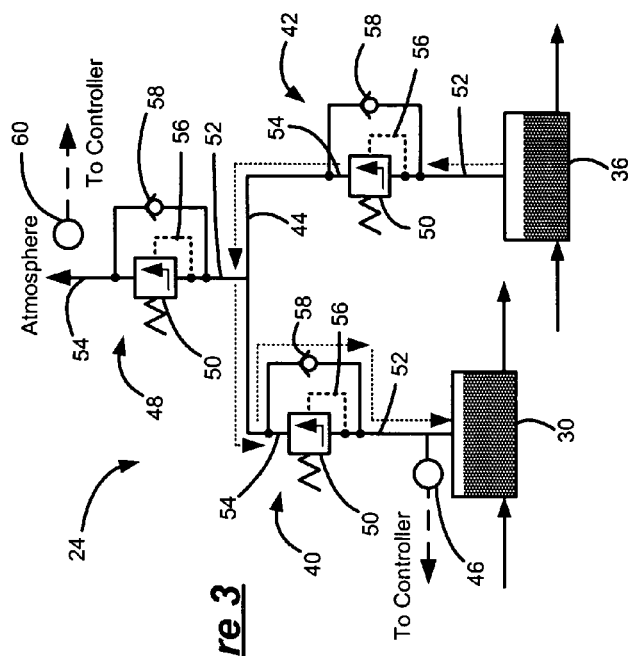
FIG. 3 is a schematic illustration of the leak management system of FIG. 2 managing a second leak condition.
Figure 2:
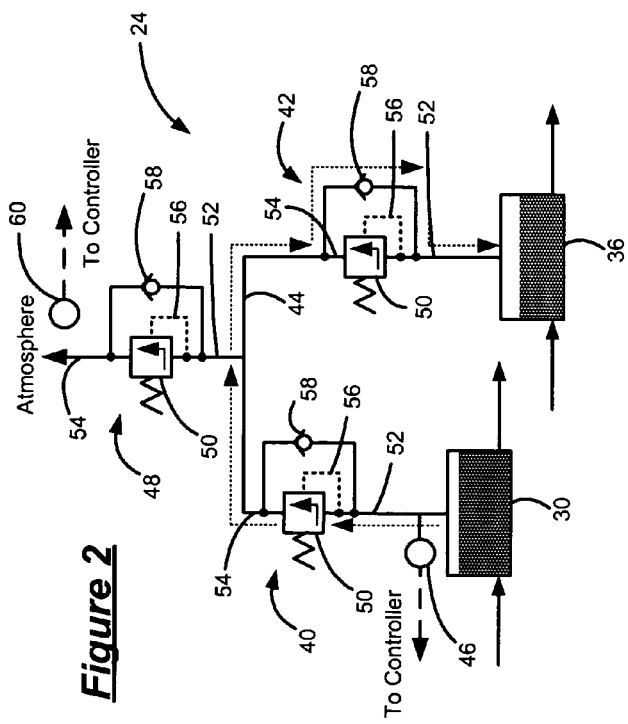
FIG. 2 is a schematic illustration of a leak management system managing a first leak condition.

Referring now to FIGS. 2 and 3, operation of the leak management system 24 operating in first and second leak conditions, respectively, will be described in detail. Generally, the leak management system 24 of FIGS. 2 and 3 is implemented in configurations where there is potential for the hydrogen feed gas to leak into the fluid in both the first and second fluid circuits 20,22. The reservoir 30 of the first fluid circuit 20 is in fluid communication with the reservoir 36 of the second fluid circuit 22 through first and second release mechanisms 40,42, respectively, serially disposed along a fluid conduit 44. A pressure sensor 46 is disposed between the first release mechanism 40 and the reservoir 30 and is in electrical communication with the controller 38. A safety mechanism 48 is in fluid communication with the fluid conduit 44 between the first and second release mechanisms 40,42.

The first and second release mechanisms 40,42 and the safety mechanism 48 are generally of a similar construction. Therefore, a generic mechanism will be described in detail. Components of the first and second release mechanisms 40,42 and the safety mechanism 48 will be identified using like reference numbers as those used to indicate components of the generic mechanism. The mechanism 40,42,48 includes a pressure relief valve 50 having an inlet and an outlet 52,54. The pressure relief valve 50 includes a pressure setting. A pilot conduit 56 is in fluid communication with the pressure relief valve 56. As the fluid pressure builds at the inlet 52, the pilot conduit 56 applies the pressure to the pressure relief valve 50. Once the pressure achieves the pressure setting, the pressure relief valve 50 opens to vent the fluid through the pressure relief valve 50 and the outlet 54. A one-way valve 58 enables selective fluid flow from the outlet 54 to the inlet 52. More particularly, if the fluid pressure in the inlet 52 is higher than the fluid pressure in the outlet 54, the one-way valve 58 remains closed to prohibit fluid communication from the inlet 52 to the outlet 54. If the fluid pressure in the outlet 54 is higher than the fluid pressure in the inlet 52, the one-way valve 58 opens to enable fluid flow from the outlet 54 to the inlet 52.

With particular reference to FIG. 2, the leak management system 24 is illustrated experiencing a first leak condition. During the first leak condition, hydrogen feed gas leaks into the first fluid circuit 20. The hydrogen feed gas leak results in a pressure increase within the first fluid circuit 20 including the fluid reservoir 30. If the hydrogen leak persists, the pressure increases until the pressure at the inlet 52 of the first release mechanism 40 becomes greater than the pressure setting ($P_1$) of the first release mechanism 40. When the inlet pressure surpasses $P_1$, the pressure relief valve 50 opens enabling fluid flow therethrough. The fluid flow from the first release mechanism 40 increases the fluid pressure within the fluid conduit 44. If the fluid pressure within the fluid conduit 44 is greater than the fluid pressure within the inlet 52 of the second release mechanism 42, fluid flow is enabled into the reservoir 36 of the second fluid circuit 22 through the one-way valve 58. In this manner, a pressure balance is achieved and the pressure increase is shared between the first and second fluid circuits 20,22. Fluid flow between the fluid reservoirs 30,36 during the first leak condition is indicated by the arrows of FIG. 2.

With particular reference to FIG. 3, the leak management system 24 is illustrated experiencing a second leak condition. During the second leak condition, hydrogen feed gas leaks into the second fluid circuit 22. The hydrogen feed gas leak results in a pressure increase within the second fluid circuit 22 including the fluid reservoir 36. If the hydrogen leak persists, the pressure increases until the pressure at the inlet 52 of the second release mechanism 42 becomes greater than the pressure setting ($P_2$) of the second release mechanism 42. When the inlet pressure surpasses $P_2$, the pressure relief valve 50 opens enabling fluid flow therethrough. The fluid flow from the second release mechanism 42 increases the fluid pressure within the fluid conduit 44. If the fluid pressure within the fluid conduit 44 is greater than the fluid pressure within the inlet 52 of the first release mechanism 40, fluid flow is enabled into the reservoir 30 of the first fluid circuit 20 through the one-way valve 58. In this manner, a pressure balance is achieved and the pressure increase is shared between the first and second fluid circuits 20,22. Fluid flow between the fluid reservoirs 30,36 during the second leak condition is indicated by the arrows of FIG. 3.

Referring now to both FIGS. 2 and 3, the safety mechanism 48 functions to prevent an over-pressure event. An over-pressure event in either the first or second fluid circuits 20,22 could result in damage to the components of the fluid circuits. As the fluid pressure continues to increase within the leak management system 24 a shut-down threshold may be achieved. More particularly, the pressure sensor 46 monitors the overall pressure in the leak management system 24. When the pressure achieves the shut-down threshold the controller 38 shuts down the fuel cell system 10. It should be noted that the pressure settings $P_1$ and $P_2$ of the first and second release mechanisms 40,42, respectively, are lower than the shut-down threshold.

Although the fuel cell system 10 shuts-down it is conceivable that the pressure within the leak management system 24 can increase. In such a situation, the safety mechanism 48 enables pressure relief to the atmosphere if the pressure achieves a vent threshold. More particularly, when the pressure surpasses the pressure setting ($P_3$) of the pressure relief valve 50 of the safety mechanism 48, the pressure relief valve 50 opens to vent fluid pressure to the atmosphere. The pressure settings $P_1$ and $P_2$ of the first and second release mechanisms 40,42, respectively, are lower than the pressure setting $P_3$ of the safety mechanism 48.

A hydrogen sensor 60 can be included at or within the proximity of the outlet 54 of the safety mechanism 60. The hydrogen sensor 60 generates a signal indicative of the hydrogen content of the atmosphere surrounding the safety mechanism 48. The controller 38 monitors the hydrogen content signal. If the hydrogen content signal achieves a content threshold, the controller 38 issues an alert to an operator. The alert can be a visual alert, audible alert or both a visual and audible alert.

It is anticipated that the leak management system 24 can be incorporated into individual or common components of the fluid reservoirs 30,36. More particularly, the first release mechanism 40 can be integrated into a filler cap or cover (not shown) of the fluid reservoir 30 of the first fluid circuit 20. Similarly, the second release mechanism 42 can be integrated into a filler cap or cover (not shown) of the fluid reservoir 36 of the second fluid circuit 22. Alternatively, the first and second release mechanisms 40,42, as well as the safety mechanism 48, can be integrated into a common reservoir cover associated with both fluid reservoirs 30,36.

Figure 4:
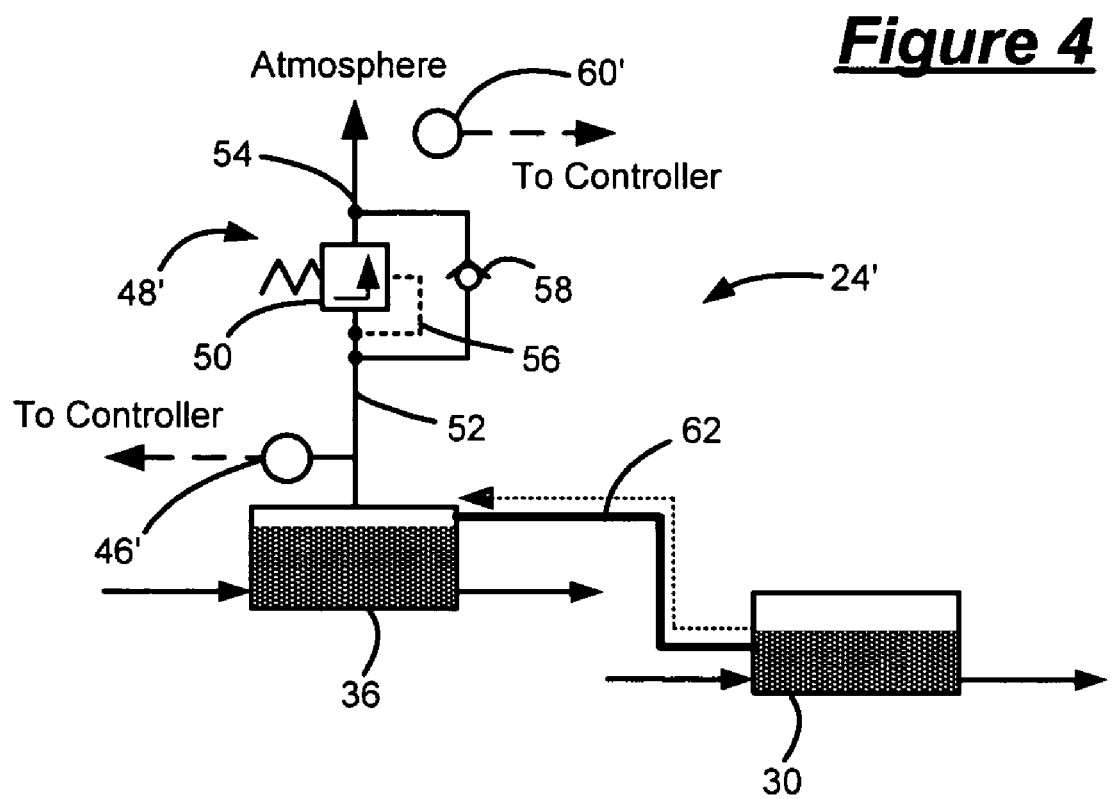
FIG. 4 is a schematic illustration of an alternative leak management system managing the first leak condition.

Referring now to FIG. 4, an alternative leak management system 24' is illustrated. The leak management system 24' is generally implemented between the first and second fluid circuits 20,22 where only one fluid circuit is in communication with a hydrogen feed gas source. In the configuration of FIG. 4, the first fluid circuit 20 is in communication with the hydrogen feed gas source (e.g., the fuel cell stack 12). The leak management system 24' includes a tube 62 that enables fluid communication between the fluid reservoir 30 of the first fluid circuit 20 and the fluid reservoir 36 of the second fluid circuit 22. The tube 62 is connected to the fluid reservoir 30 of the first fluid circuit 30 at a point below the fluid level within the fluid reservoir 30. The tube 62 is connected to the fluid reservoir 36 of the second fluid circuit 22 at a point above the fluid level of the fluid reservoir 36. The leak management system 24' further includes a safety mechanism 48' in fluid communication with the fluid reservoir 36 of the second fluid circuit 22 and a pressure sensor 46' disposed between the fluid reservoir 36 and the safety mechanism 48'.

In the event of a hydrogen feed gas leak into the fluid circulating through the first fluid circuit 20, the pressure within the first fluid circuit 20 increases. As the pressure within the first fluid circuit increases 20 fluid from the fluid reservoir 30 of the first fluid circuit 20 flows into the fluid reservoir 36 of the second fluid circuit 22 through the tube 62. In this manner, the pressure increase within the first fluid circuit 20 is shared with the second fluid circuit 22. If the hydrogen leak persists, the pressure will increase until achieving the shut-down threshold as monitored by the pressure sensor 46'. When the pressure achieves the shut-down threshold the controller 38 shuts down the fuel cell system 10. It should be noted that the pressure setting $P_3$ of the safety mechanism 48 is greater than the shut-down threshold.

As similarly described above for the leak management system 24, a hydrogen sensor 60' can be included at or near the outlet 54 of the safety mechanism 48'. The hydrogen sensor 60' generates a signal indicative of the hydrogen content of the atmosphere surrounding the safety mechanism 48'. The controller 38 monitors the hydrogen content signal. If the hydrogen content signal achieves a content threshold, the controller 38 issues an alert to an operator. The alert can be a visual alert, audible alert or both a visual and audible alert.

It is anticipated that the leak management system 24' can be incorporated into individual or common components of the fluid reservoirs 30,36. More particularly, the safety mechanism 48' can be integrated into a filler cap or cover (not shown) of the fluid reservoir 36 of the second fluid circuit 22. Similarly, the safety mechanism 48' can be integrated into a common reservoir cover associated with both fluid reservoirs 30,36. The tube 62 can be formed as a passage through a common wall that separates the fluid reservoirs 30,36.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pressure management system that balances pressure between first and second fluid circuits of a fuel cell system, comprising:
   a first fluid reservoir associated with said first fluid circuit, said first fluid circuit functioning to regulate a temperature of a fuel cell stack; and
   a second fluid reservoir associated with said second fluid circuit and in fluid communication with said first fluid reservoir, said second fluid circuit functioning to regulate a temperature of an electrical load of said fuel cell system, wherein a fluid is transferred from said first fluid reservoir to said second fluid reservoir during an over-pressure condition within said first fluid circuit.

2. The pressure management system of claim 1 further comprising a fluid passage that enables said fluid communication between said first and second fluid reservoirs.

3. The pressure management system of claim 2 wherein a first fluid retained within said first fluid reservoir flows into said second fluid reservoir during said over-pressure condition.

4. The pressure management system of claim 1 further comprising a first relief mechanism that is disposed between said first and second fluid reservoirs and that selectively enables fluid communication between said first and second fluid reservoirs.

5. The pressure management system of claim 4 wherein when a first pressure is achieved within said first fluid reservoir, said fluid flows through said first relief mechanism to said second fluid reservoir to relieve said first pressure.

6. The pressure management system of claim 4 further comprising a second relief mechanism that is disposed between said first and second fluid reservoirs and that selectively enables fluid communication between said first and second fluid reservoirs.

7. The pressure management system of claim 6 wherein when a second pressure is achieved within said second fluid reservoir, said fluid flows through said second relief mechanism to said first fluid reservoir to relieve said second pressure.

8. The pressure management system of claim 1 further comprising a relief mechanism in fluid communication with said first fluid reservoir, said relief mechanism exhausting said fluid to atmosphere during a critical pressure condition.

9. A fuel cell system, comprising:
   a fuel cell having a hydrogen-containing feed gas flowing therethrough;
   a first fluid circuit that includes a first fluid reservoir that is in fluid communication with said fuel cell and that has a first fluid flowing therethrough, said first fluid circuit functioning to regulate a temperature of a fuel cell stack; and
   a second fluid circuit that includes a second fluid reservoir and that has a second fluid flowing therethrough, said second fluid circuit functioning to regulate a temperature of an electrical load of said fuel cell system, wherein a fluid is transferred from said first fluid reservoir to said second fluid reservoir during an over-pressure condition within said first fluid circuit.

10. The fuel cell system of claim 9 further comprising a fluid passage that enables fluid communication between said first and second fluid reservoirs.

11. The fuel cell system of claim 10 wherein said first fluid from said first fluid reservoir flows into said second fluid reservoir during said over-pressure condition.

12. The fuel cell system of claim 9 further comprising a first relief mechanism that is disposed between said first and second fluid reservoirs and that selectively enables fluid communication between said first and second fluid reservoirs.

13. The fuel cell system of claim 12 wherein when a first pressure is achieved within said first fluid reservoir, said fluid flows through said first relief mechanism to said second fluid reservoir to relieve said first pressure.

14. The fuel cell system of claim 12 further comprising a second relief mechanism that is disposed between said first and second fluid reservoirs and that selectively enables fluid communication between said first and second fluid reservoirs.

15. The fuel cell system of claim 14 wherein when a second pressure is achieved within said second fluid reservoir, said fluid flows through said second relief mechanism to said first fluid reservoir to relieve said second pressure.

16. The fuel cell system of claim 9 further comprising a relief mechanism in fluid communication with said first fluid reservoir, said relief mechanism exhausting said fluid to atmosphere during a critical pressure condition.

17. The fuel cell system of claim 16 further comprising a hydrogen sensor that detects a hydrogen-content of said atmosphere and signals an alert if said hydrogen content achieves a threshold level.

18. The fuel cell system of claim 9 further comprising a pressure sensor that detects a combined pressure of said first and second fluid reservoirs and signals an alert if said combined pressure achieves a threshold level.

* * * * *